United States Patent
Sanguramath et al.

(10) Patent No.: US 11,911,745 B2
(45) Date of Patent: Feb. 27, 2024

(54) BETA-CYCLODEXTRIN-BASED MONOLITHS THROUGH EMULSION TEMPLATING

(71) Applicant: Technion Research & Development Foundation Limited, Haifa (IL)

(72) Inventors: Rajashekharayya A. Sanguramath, Haifa (IL); Inna Berezovska, Haifa (IL); Michael S. Silverstein, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 4 days.

(21) Appl. No.: 17/391,096

(22) Filed: Aug. 2, 2021

(65) Prior Publication Data

US 2022/0040670 A1  Feb. 10, 2022

Related U.S. Application Data

(60) Provisional application No. 63/063,359, filed on Aug. 9, 2020.

(51) Int. Cl.
| | |
|---|---|
| *B01J 20/26* | (2006.01) |
| *C08G 18/73* | (2006.01) |
| *C08G 18/24* | (2006.01) |
| *C08G 18/48* | (2006.01) |
| *B01D 39/16* | (2006.01) |
| *B01J 20/30* | (2006.01) |
| *C09K 3/32* | (2006.01) |
| *C08G 18/32* | (2006.01) |
| *B01J 20/28* | (2006.01) |
| *B01J 20/24* | (2006.01) |

(52) U.S. Cl.
CPC ........... *B01J 20/262* (2013.01); *B01D 39/16* (2013.01); *B01D 39/1676* (2013.01); *B01J 20/24* (2013.01); *B01J 20/264* (2013.01); *B01J 20/28042* (2013.01); *B01J 20/3085* (2013.01); *C08G 18/246* (2013.01); *C08G 18/3218* (2013.01); *C08G 18/4804* (2013.01); *C08G 18/4841* (2013.01); *C08G 18/4883* (2013.01); *C08G 18/73* (2013.01); *C09K 3/32* (2013.01)

(58) Field of Classification Search
CPC ...... B01J 20/262; B01J 20/3085; B01J 20/24; B01J 20/264; B01J 20/28042; B01D 39/16; B01D 39/1676; C08G 18/246; C08G 18/4804; C08G 18/4841; C08G 18/4883; C08G 18/73; C08G 18/3218; C09K 3/32

See application file for complete search history.

(56) References Cited

U.S. PATENT DOCUMENTS

2019/0060868 A1  2/2019  Dichtel et al.

FOREIGN PATENT DOCUMENTS

WO  WO-2018002916 A1 *  1/2018 ............. C08G 18/14

OTHER PUBLICATIONS

Alsbaiee et al. "Rapid Removal of Organic Micropollutants From Water by a Porous Beta-Cyclodextrin Polymer", Nature, 529(7585): 190-194, Published Online Dec. 21, 2015.
Bhattarai et al. "Development of High Efficiency Silica Coated Beta-Cyclodextrin Polymeric Adsorbent for the Removal of Emerging Contaminants of Concern From Water", Journal of Hazardous Materials, 273: 146-154, Available Online Mar. 31, 2014.
Gao et al. "Supramolecular Assembly of Poly(Beta-Cyclodextrin) Block Copolymer and Benzimidazole-Poly(Epsilon-Caprolactone) Based on Host-Guest Recognition for Drug Delivery", Colloids and Surfaces B: Biointerfaces, 160: 364-371, Published Online Sep. 22, 2017.
Meng et al. "Hyper-Crosslinked Cyclodextrin Porous Polymer: An Efficient CO2 Capturing Material With Tunable Porosity", RSC Advances, 6: 110307-110311 , Published Online Nov. 11, 2016.
Silverstein "Emulsion-Templated Porous Polymers: A Retrospective Perspective", Polymer, 55(1): 304-320, Available Online Sep. 11, 2013.
Tang et al. "Rapid and Efficient Removal of Estrogenic Pollutants From Water by Using Beta- and Gamma-Cyclodextrin Polymers", Chemical Engineering Journal, 344: 514-523, Jul. 15, 2018.
Wang et al. "A Crosslinked Beta-Cyclodextrin Polymer Used for Rapid Removal of a Broad-Spectrum of Organic Micropollutants From Water", Carbohydrate Polymers, 177: 224-231, Published Online Aug. 19, 2017.
Xiao et al. "Cyclodextrin-Based Polyurethanes Act as Selective Molecular Recognition Materials of Active Pharmaceutical Ingredients (APIs)", Polymer Chemistry, 2: 1264-1266, Published Online Apr. 24, 2011.
Zhou et al. "Adsorptive Removal of Bisphenol A, Chloroxylenol, and Cabamazepine From Water Using a Novel Beta-Cyclodextrin Polymer", Ecotoxicology and Environmental Safety, 170: 278-285, Published Online Dec. 7, 2018.

\* cited by examiner

*Primary Examiner* — Rabon A Sergent

(57) ABSTRACT

Provided herein is a porous β-cyclodextrin-containing monolith having a microstructure templated by the external phase of a HIPE, as well as processes of manufacturing the same and uses thereof.

12 Claims, 4 Drawing Sheets

BETA-CYCLODEXTRIN-BASED MONOLITHS THROUGH EMULSION TEMPLATING

RELATED APPLICATION/S

Figure 1:
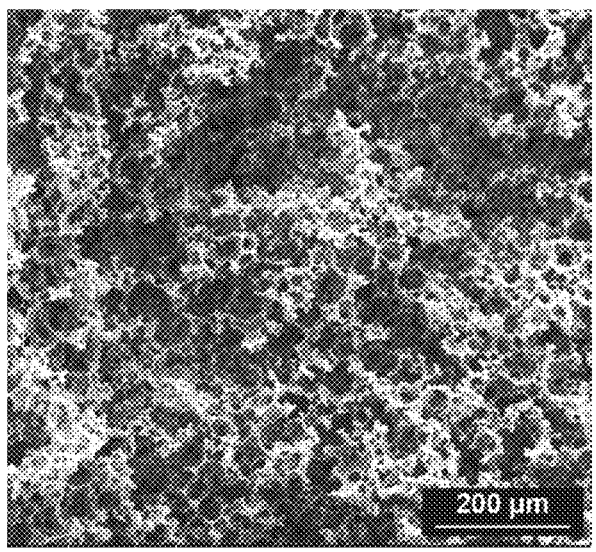
Figure 1:
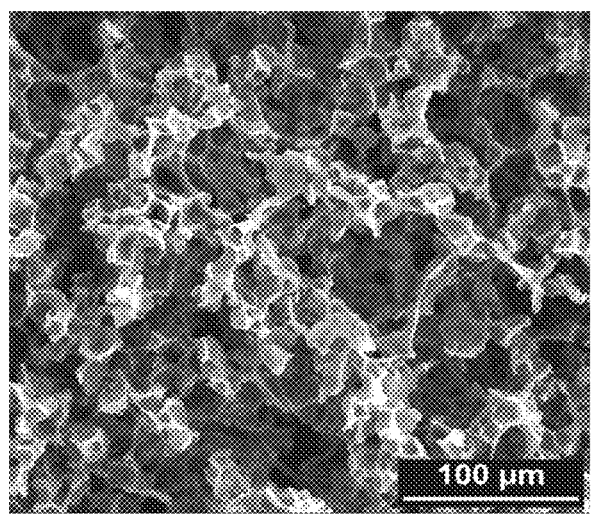
Figure 1:
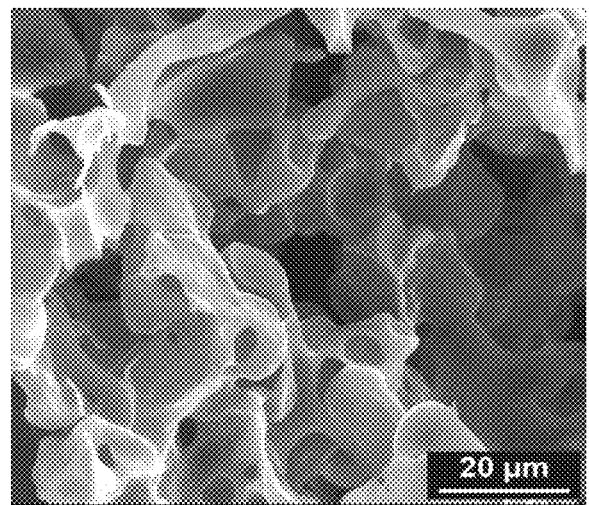

This application claims the benefit of priority of U.S. Provisional Patent Application No. 63/063,359 filed on Aug. 9, 2020, the contents of which are incorporated herein by reference in their entirety.

FIELD AND BACKGROUND OF THE INVENTION

The present invention, in some embodiments thereof, relates to material science, and more particularly, but not exclusively, to a porous monolith containing β-cyclodextrin.

β-Cyclodextrin (β-CD), which belongs to the family of cyclic oligosaccharides, is composed of 7 glucose units ($M_w$=1135 g/mol) that are connected through α-1,4-glycoside bonds. β-CD is a predominant product of the enzymatic degradation of starch and it is considered as the most available, lowest-priced and most useful from the family of cyclodextrins. β-CD has a circular arrangement of glucose units forming a torus-like molecular shape with the 21 OH groups (3 per each glucose unit) organized such that they are on the more hydrophilic outer surface, leaving the inner surface to be a relatively hydrophobic cavity. Although β-CD has a highly pronounced hydrophilic structure, its solubility in water is limited to 1.8% (w/v) due to the large number of intramolecular hydrogen bonds among the hydroxyl groups. These interactions make the structure rigid and prevent hydration by water molecules. At the same time, β-CD is highly soluble in polar aprotic solvents such as N,N-dimethylformamide (DMF) (28%, w/v) and dimethyl sulfoxide (DMSO) (>41%, w/v).

The structural arrangement of β-CD makes it conducive to the formation of host-guest complexes with relatively hydrophobic molecules such as bisphenol A (BPA) which is widely used in the production of polycarbonates and epoxy resins. Recently, BPA was listed as a possible endocrine disrupter, even in small doses. Although BPA has a relatively low solubility in water, a relatively high concentration was detected in the oceans. Therefore, it is vitally important to develop efficient methods of removing BPA from water. Polymers containing β-CD have demonstrated selective adsorption of BPA.

Most porous polymers that containing β-CD for adsorption applications use the β-CD in the form of a powder [Alsbaiee, A. et al., Nature, 2015, 529, 190; Wang, Z. et al., Carbohydrate Polymers, 2017, 177, 224-231; and Zhou, Y. et al., Ecotoxicology and Environmental Safety, 2019, 170, 278-285]. It would be advantageous to use β-CD in the form of a highly porous monolith that would provide rapid liquid transport to easily accessible β-CD within a convenient shape that is preserved during use. However, it is difficult to incorporate high quantities of β-CD in monoliths, and particularly difficult to make the monolith have a high surface area (porous monoliths, or foams).

Emulsion templating within oil-in-water (o/w) high internal phase emulsions (HIPEs) has been used to generate highly porous monoliths, termed polyHIPEs, based on polysaccharides and polyphenols through a urethane step-growth reaction that took place at the oil-water interface [Silverstein, M. S., Polymer, 2014, 55, 304-320]. Unfortunately, this approach is not practical for generating a polyHIPEs based on β-CD owing to its relatively low solubility in water.

WO 2018/002916 discloses monoliths based on polysaccharides polymerization within oil-in-water (O/W) HIPEs, using interfacial step-growth (ISG) polymerization between functional groups on the polysaccharides (hydroxyl, polyol, carboxyl, amine) in the aqueous external phase and the isocyanate groups on a multifunctional isocyanate (MI) in the organic internal phase. The result was a polysaccharide-based poly(urethane urea) copolymer where the urethane groups result from the reaction of the polysaccharide hydroxyl groups with the isocyanates and the urea groups result from the reaction of water with the isocyanates. However, when it comes to β-CD, there is a limit to the amount of β-CD that can be included in monoliths using the route described in WO 2018/002916: (1) the amount of β-CD that can be included in the aqueous external phase is limited owing to the low solubility of β-CD in water; (2) there are a great many side/competitive reactions of isocyanate with water rather than with the polysaccharide.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

SUMMARY OF THE INVENTION

According to an aspect of some embodiments of the present invention, there is provided a composition-of-matter which includes a polymer, wherein the polymer includes a plurality of β-cyclodextrin residues, and wherein the composition-of-matter has a microstructure that is templated by a polymerized high internal phase emulsion (HIPE).

In some embodiments, the polymer is a substantially crosslinked polymer.

In some embodiments, the content of the β-cyclodextrin residues in the polymer is at least 10 wt %.

In some embodiments, the composition-of-matter is characterized by having less than 10% urea residues.

In some embodiments, the composition-of-matter, or the polymer, is essentially devoid of urea residues.

In some embodiments, the polymer further includes residues of a polyisocyanate (functionality greater than one) monomer.

In some embodiments, the polymer further includes residues of a polyisocyanate (functionality greater than two) monomer.

In some embodiments, the polyisocyanate is a diisocyanate monomer.

In some embodiments, the diisocyanate monomer is selected from the group consisting of hexamethylene diisocyanate (HDI), isophorone diisocyanate (IPDI), 4,4'-dicyclohexylmethane diisocyanate, toluene diisocyanate, methylene diphenyl diisocyanate, and any combination thereof.

In some embodiments, the polymer further comprises residues of a poloxamer.

In some embodiments, the poloxamer is Pluronic F-127.

In some embodiments, the composition-of-matter is characterized by a density lower than 0.3 g/cc.

In some embodiments, the composition-of-matter is characterized by a gel contents of at least 50%.

In some embodiments, the composition-of-matter is characterized by a modulus of at least 0.3 MPa.

In some embodiments, the composition-of-matter is characterized by a compressive failure strain of at least 10%.

According to another aspect of some embodiments of the present invention, there is provided a process of preparing the composition-of-matter provided herein, which is effected by:

providing a first organic phase (a first solution) that comprises β-cyclodextrin and a polyisocyanate;

mixing the first organic phase with a second organic phase that is immiscible with/in the first organic phase, and a surfactant/HIPE-stabilizer, thereby obtaining a HIPE; and polymerizing the HIPE, thereby obtaining the composition-of-matter.

In some embodiments, the surfactant/HIPE-stabilizer is selected from the group consisting of a poloxamer, polyglycerol polyricinoleate (PGPR), a plurality of polymer stars, a plurality of nanoparticles, and the like.

In some embodiments, the first organic phase and/or the second organic phase further comprises an initiator and/or a catalyst.

In some embodiments, the process further includes, subjecting the composition-of-matter to Soxhlet extraction subsequent to the polymerizing.

In some embodiments, the process further includes, drying the composition-of-matter under ambient or reduced pressure and/or under ambient or elevated temperature subsequent to the polymerizing.

According to another aspect of some embodiments of the present invention, there is provided an article of manufacturing that includes the composition-of-matter provided herein.

In some embodiments, the article is selected from the group consisting of a spillage containment device, a pollution detection and prevention device, and an in-flow filter.

BRIEF DESCRIPTION OF THE SEVERAL
VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 2:
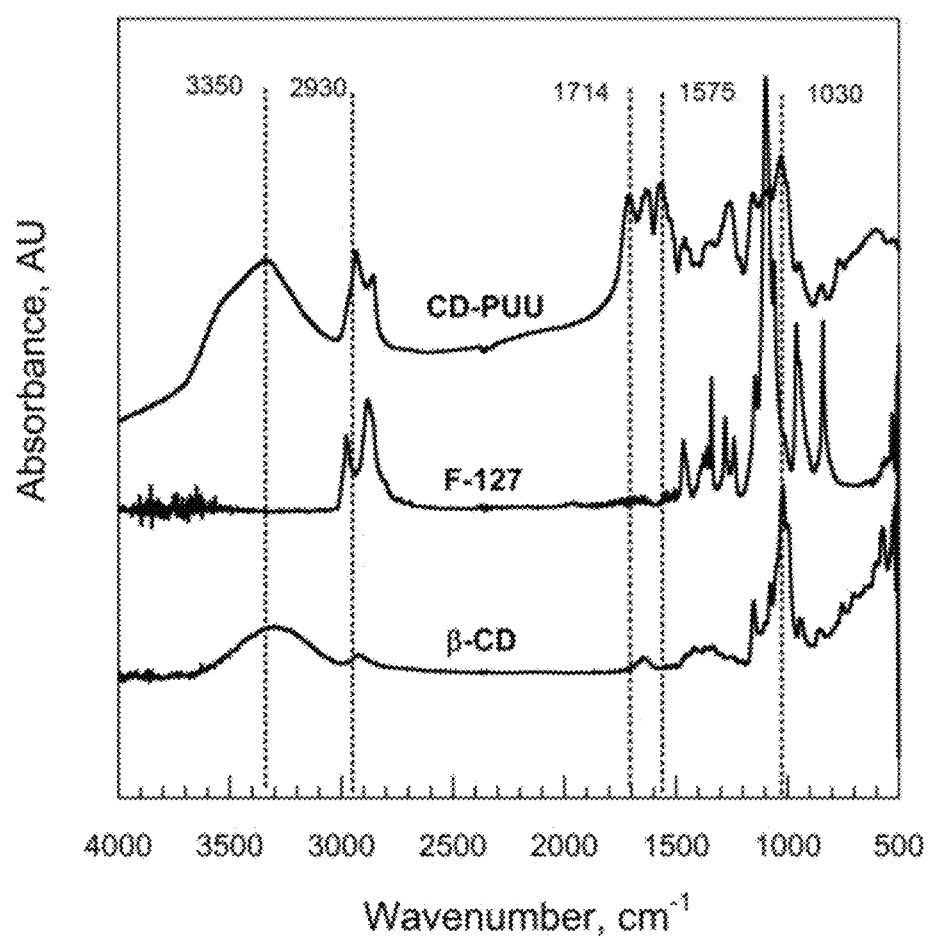
Figure 3:
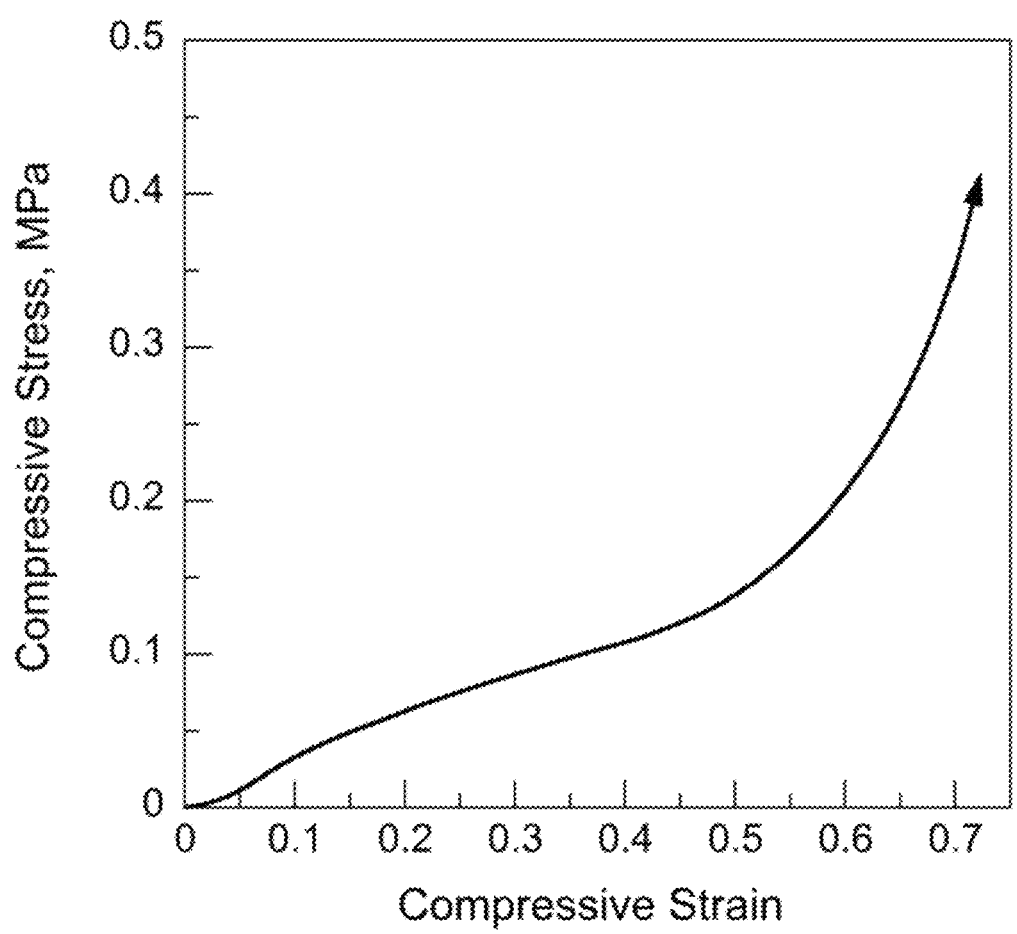
Figure 4A:
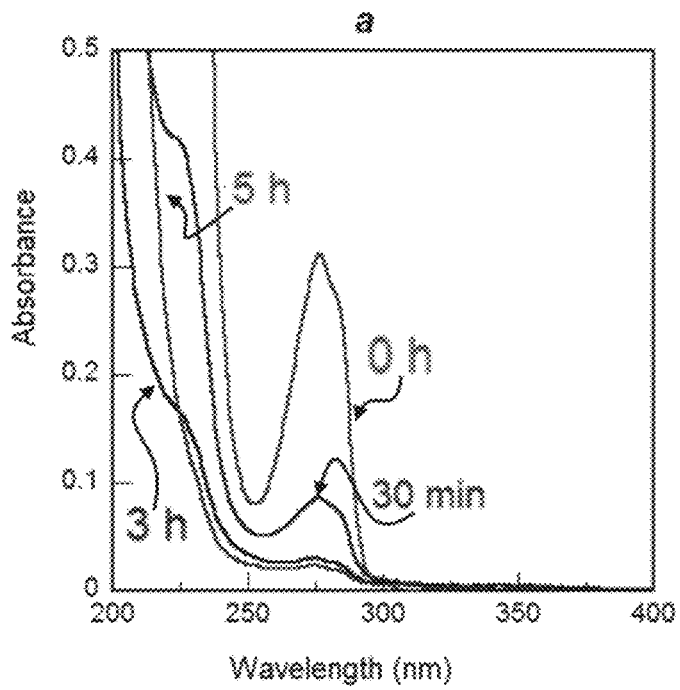
Figure 4B:
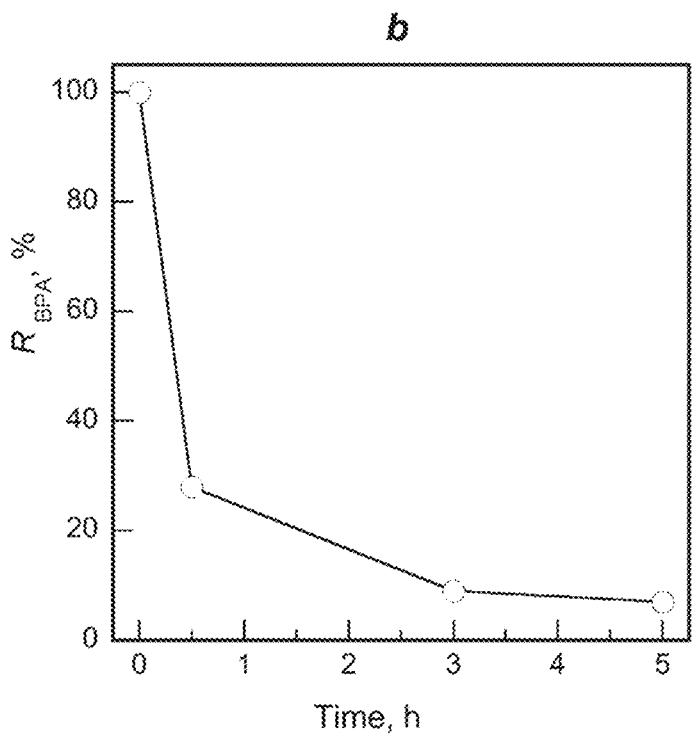

In the drawings:

FIG. 1 presents SEM micrographs at various magnification levels of the exemplary β-CD-polyHIPE prepared as described herein;

FIG. 2 presents FTIR spectra of β-CD (the building block, or monomer), F-127 (the surfactant/reactant), and an exemplary β-CD-polyHIPE prepared as described herein;

FIG. 3 presents a plot showing the compressive stress-strain curves of an exemplary β-CD-polyHIPE prepared as described herein; and FIGS. 4A-B present UV adsorption curves, showing the amount of BPA decreasing in a 10 mL solution sample from 0.1 mM BPA, using 50 mg of the adsorbent β-CD-polyHIPE, according to some embodiments of the present invention, wherein FIG. 4A shows the UV-vis spectra of the solution at various time intervals, and FIG. 4B shows the percentage of BPA remaining in the solution, $R_{BPA}$, as a function of time.

DESCRIPTION OF SPECIFIC EMBODIMENTS
OF THE INVENTION

The present invention, in some embodiments thereof, relates to material science, and more particularly, but not exclusively, to a porous monolith containing β-cyclodextrin.

The principles and operation of the present invention may be better understood with reference to the figures and accompanying descriptions.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

This document discloses a novel β-CD-based polyHIPE (β-CD-polyHIPE), which was generated using a relatively rare approach, synthesis through a urethane step-growth reaction between the β-CD hydroxyl groups and an isocyanate in a non-aqueous, oil-in-oil (o/o) HIPE. The use of an o/o HIPE enables access to a relatively high loading of β-CD in the external phase, and at the same time, limits the competing urea-forming reaction of the isocyanate with water.

It is expected that during the life of a patent maturing from this application many relevant β-CD-polyHIPE monolith will be developed and the scope of the term β-CD-polyHIPE monolith is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the phrases "substantially devoid of" and/or "essentially devoid of" in the context of a certain substance, refer to a composition that is totally devoid of this substance or includes less than about 5, 1, 0.5 or 0.1 percent of the substance by total weight or volume of the composition. Alternatively, the phrases "substantially devoid of" and/or "essentially devoid of" in the context of a process, a method, a property or a characteristic, refer to a process, a composition, a structure or an article that is totally devoid of a certain process/method step, or a certain property or a certain characteristic, or a process/method wherein the certain process/method step is effected at less than about 5, 1, 0.5 or 0.1 percent compared to a given standard process/method, or property or a characteristic characterized by less than about 5, 1, 0.5 or 0.1 percent of the property or characteristic, compared to a given standard.

The term "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the terms "process" and "method" refer to manners, means, techniques and procedures for accomplishing a given task including, but not limited to, those manners, means, techniques and procedures either known to, or readily developed from known manners, means, techniques and procedures by practitioners of the chemical, material, mechanical, computational and digital arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental and/or calculated support in the following examples.

EXAMPLES

Reference is now made to the following examples, which together with the above descriptions illustrate some embodiments of the invention in a non limiting fashion.

Example 1

βCD-Based PolyHIPE Synthesis—Materials and Methods

Materials: β-CD, hexamethylene diisocyanate (HDI; shown below), Pluronic F-127 poloxamer (a triblock copolymer shown below and consisting of poly(ethylene oxide) (PEO) end blocks and a poly(propylene oxide) (PPO) midblock), n-hexadecane (n-HD), dibutyltin dilaurate (DBTDL; a catalyst for polyurethane production from isocyanates and diols), and BPA were purchased from Sigma-Aldrich. All the chemicals were used as received. Analytical grade dimethylformamide (DMF) was purchased from Bio-Lab Chemicals. The DMF was dried prior to use using activated molecular sieves (about 0.4 nm) that were purchased from Merck. Dichloromethane (DCM) and ether were purchased from Bio-Lab Chemicals and used as received.

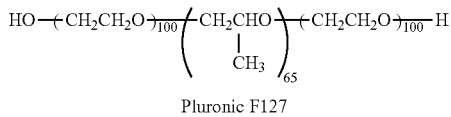

Pluronic F127

PolyHIPE Synthesis: Prior to use, the DMF was dried overnight using activated molecular sieves. The minor, external phase of the HIPE was a DMF solution of β-CD (monomer), HDI (monomer), and F-127 (surfactant). The major, internal phase of the HIPE was n-HD. The HIPE was formed by adding n-HD (oil phase 2; internal) to the DMF solution (oil phase 1; external) in three portions, mixing for 5 min at 3500 rpm using a SpeedMixer™ DAC-150.1 FVZ.K after each addition. After the final n-HD portion was mixed, the DBTDL catalyst was added and an additional 2 min mixing was applied. The HIPE was then placed for 24 hours in a convection oven at 65° C. to effect polymerization.

It is noted that an optional process includes adding vinyl groups to the β-cyclodextrin in one reaction and then use a radical or thiol-ene reaction to "polymerize" β-cyclodextrin.

The resulting β-CD-polyHIPE was purified through Soxhlet extraction, first with DCM and then with ether. The β-CD-polyHIPE was then dried overnight in a vacuum oven at room temperature. An exemplary HIPE recipe for β-CD-polyHIPE, according to some embodiments of the present invention, is presented in Table 1.

TABLE 1

|  | Amount, wt % |
| --- | --- |
| External Phase |  |
| β-Cyclodextrin (β-CD) | 4.18 |
| Hexamethylene diisocyanate (HDI) | 3.77 |
| Pluronic F-127 | 2.09 |
| Dimethylformamide (DMF) | 14.64 |
| Total | 24.69 |
| Internal Phase |  |
| n-Hexadecane (n-HD) | 75.31 |
| Total | 75.31 |
| Dibutyltin dilaurate (DBTDL) | 24 drops |

Characterization: The molecular structure was characterized using Fourier transform infrared spectroscopy (Bruker Equinox 55 FTIR). The sample was ground together with KBr and pressed to pellets for the FTIR measurements. The resulting composition-of-matter (a monolithic highly porous structure) was observed using scanning electron microscopy (SEM, FEI E-SEM Quanta 200). The average void diameter was corrected by a factor that takes into account the random nature of the section through the sphere.

Compressive stress-strain measurements were performed on 5 mm×5 mm×5 mm cubes using an Instron 3345. The measurements were carried out at a strain rate of 10% per minute until a strain of 70% was reached. The static compressive modulus (E) was calculated from the linear slope of the stress-strain curve at low strains.

BPA Adsorption: Adsorption studies were performed using ultraviolet-visible (UV-vis) spectroscopy from 200 to 600 nm (Shimadzu UV-1800) at room temperature. The β-CD-polyHIPE adsorbent was cut into rectangular pieces (10 mm×10 mm×1 mm) of about 50 mg. To remove entrapped air, the pieces of adsorbent were placed into 20 ml scintillation vials and deionized water was added. The vials were placed in a vacuum oven at low vacuum until the adsorbent sank to the bottom of the vials (between 30 and 90 minutes). The amount of water that evaporated during the deaeration process was determined by mass loss and the amount that evaporated was replaced. The concentration of the working BPA solution, 0.1 mM, was achieved using a stock solution such that the 50 mg of sorbent was immersed in 10 mL of a 0.1 mM BPA solution. The concentration of BPA in the solution was followed as a function of time by removing a sample of the solution from the vial using a Pasteur pipette at various time intervals (the vials were only used for one concentration measurement). Any debris in the solution was removed by passing it through a pipette containing cotton. The relative concentration of BPA was determined using UV-vis spectroscopy based on a calibration curve at 276 nm. The fraction of BPA removed ($R_{BPA}$) was determined using Equation 1:

$$R_{BPA} = \frac{(C_0 - C_t)}{C_0} \qquad \text{Equation 1}$$

wherein $C_0$ (mmol/L) and $C_t$ (mmol/L) are the initial and residual concentrations of the working solution and the solution samples taken at various time intervals, respectively.

Example 2

Results and Analysis

The resulting exemplary β-CD-polyHIPE was afforded as a white monolith with a relatively low density (0.11 g/cc) and with a uniform, highly porous structure (see, FIG. 1).

FIG. 1 presents SEM micrographs in various magnification levels of the exemplary β-CD-polyHIPE prepared as described herein.

As can be seen in FIG. 1, the composition-of-matter, according to some embodiments of the present invention, was afforded while being templated by the precursor HIPE, giving rise to a porous monolith.

FIG. 2 presents an FTIR spectra of β-CD (the building block, or monomer), F-127 (the surfactant/reactant), and an exemplary β-CD-polyHIPE prepared as described herein.

Urethane groups are generated through the reaction of HDI with the hydroxyl groups in β-CD and F-127, while urea groups can be generated through the reaction of HDI with any traces of water in the system and in the environment. As can be seen in FIG. 2, the absence of a band at 2270 cm$^{-1}$ (NCO stretching) indicates the complete reaction of the HDI. The spectrum of β-CD-polyHIPE exhibits urea CNH stretching at 1575 cm$^{-1}$ and pronounced urethane C=O stretching at 1714 cm$^{-1}$. The broad band at around 3350 cm$^{-1}$ that can be associated with NH stretching corresponds to both urethane and urea. The presence of symmetric and asymmetric stretches of CH$_2$ at 2860 and 2930 cm$^{-1}$, respectively, indicates that some F-127 was incorporated into the β-CD-polyHIPE macromolecular structure through reaction with the HDI. The FTIR spectra of both β-CD and β-CD-polyHIPE exhibit intense C—O stretching at 1030 cm$^{-1}$ that is characteristic of β-CD.

FIG. 3 presents a plot showing the compressive stress-strain curves of an exemplary β-CD-polyHIPE prepared as described herein As can be seen in FIG. 3, the compressive stress-strain curve of β-CD-polyHIPE is characteristic of elastomeric, open-cell foams with a linear stress-strain relationship at low strains that exhibits a modulus of 0.44 MPa, a decrease in the rate of stress increase with strain at intermediate strains, and a rapid increase in stress with strain at higher strains. The β-CD-polyHIPE, according to some embodiments of the present invention, did not fail up to compressive strains of 70%.

FIGS. 4A-B present UV adsorption curves, showing the amount of BPA decreasing in a 10 mL solution sample from 0.1 mM BPA, using 50 mg of the adsorbent β-CD-polyHIPE, according to some embodiments of the present invention, wherein FIG. 4A shows the UV-vis spectra of the solution at various time intervals, and FIG. 4B shows the percentage of BPA remaining in the solution, $R_{BPA}$, as a function of time.

Additional adsorption tests using more solution and less adsorbent in the article have reached an equilibrium of 30.2 mg BPA per gram adsorbent and have demonstrated a BPA adsorption capacity of 74.6 mg/g.

As can be seen in FIGS. 4A-B, the adsorbent β-CD-polyHIPE, according to some embodiments of the present invention, removed 72% of the BPA from the 0.1 mM solution within the first 30 minutes and 90% of BPA were removed within the next 2.5 hours. The monolith maintained its shape during the experiment and was easily removed from the solution.

The demonstration of the basic concept of the present invention has been proven valid, as a highly porous monolith based on β-cyclodextrin (an exemplary embodiment of a composition-of-matter of the present invention) was synthesized successfully through a urethane step-growth reaction within an oil-in-oil high internal phase emulsion. The resulting β-CD-polyHIPE was a white monolith with a density of 0.11 g/cc and a modulus of 0.44 MPa that could undergo 70% compressive strain without failing. In addition, the β-CD-polyHIPE has been shown to successfully remove bisphenol A from an aqueous solution within a few hours.

Example 3

Crosslinking Fraction, Insoluble and Gel Contents

The insoluble content (IC), the insoluble fraction of the polymer, is, under certain circumstances, referred to as the gel content (GC) of the polymer, or the crosslinked fraction of the polymer.

The IC of the polymer provided herein is determined by extracting the polymer with a solvent that is known to dissolve the polymer (e.g., N,N-dimethylformamide, DMF). Specifically, samples of the dry polymer ($m_b$) are placed in filter-paper envelopes and immersed in refluxed boiling solvent for 48 hours. The samples are removed, dried in a vacuum oven for 24 hours, and the resulting dry mass ($m_a$) is determined, wherein the IC of the polymer is determined by the ratio of $m_a$ to $m_b$.

In the context of the present disclosure, IC is used instead of GC when there may be urea groups that are hard to dissolve, even in a linear, non-crosslinked polymer.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

To the extent that section headings are used, they should not be construed as necessarily limiting. In addition, any priority document(s) of this application is/are hereby incorporated herein by reference in its/their entirety.

What is claimed is:

1. A composition-of-matter comprising a polymer, said polymer comprises a plurality of β-cyclodextrin residues and a plurality of residues of a polyisocyanate monomer, and having a microstructure that is templated by a polymerized high internal phase emulsion (HIPE), wherein said polyisocyanate monomer is a diisocyanate monomer and a content of said β-cyclodextrin residues in said polymer is at least 10 wt %.

2. The composition-of-matter of claim 1, essentially devoid of urea residues.

3. The composition-of-matter of claim 1, wherein said diisocyanate monomer is selected from the group consisting of hexamethylene diisocyanate (HDI), isophorone diisocyanate (IPDI), 4,4'-dicyclohexylmethane diisocyanate, toluene diisocyanate, methylene diphenyl diisocyanate, and any combination thereof.

4. The composition-of-matter of claim 1, wherein said polymer further comprises residues of a poloxamer.

5. The composition-of-matter of claim 1, characterized by at least one of:
a density lower than 0.3 g/cc;
a modulus of at least 0.3 MPa; and/or
a compressive failure strain of at least 10%.

6. A process of preparing the composition-of-matter of claim 1, the process comprising:
providing a first organic phase (a first solution) that comprises β-cyclodextrin and a polyisocyanate;
mixing said first organic phase with a second organic phase that is immiscible with/in said first organic phase, and a surfactant/HIPE-stabilizer, thereby obtaining a HIPE; and
polymerizing said HIPE, thereby obtaining the composition-of-matter.

7. The process of claim 6, wherein said surfactant/HIPE-stabilizer is selected from the group consisting of a poloxamer, polyglycerol polyricinoleate (PGPR), and a star polymer.

8. The process of claim 6, wherein said first organic phase and/or said second organic phase further comprises an initiator and/or a catalyst.

9. The process of claim 6, further comprising, subsequent to said polymerizing, subjecting the composition-of-matter to Soxhlet extraction.

10. The process of claim 6, further comprising, subsequent to said polymerizing, drying the composition-of-matter under ambient or reduced pressure and/or under ambient or elevated temperature.

11. An article of manufacturing comprising the composition-of-matter of claim 1.

12. The article of claim 11, selected from the group consisting of a spillage containment device, a pollution detection and prevention device, and an in-flow filter.

* * * * *